United States Patent
Li et al.

(10) Patent No.: US 11,381,544 B2
(45) Date of Patent: Jul. 5, 2022

(54) SERVICE TYPE DETERMINING METHOD AND RELATED DEVICE

(71) Applicant: HUAWEI TECHNOLOGIES CO., LTD., Shenzhen (CN)

(72) Inventors: Wanyu Li, Nanjing (CN); Qingping Yang, Nanjing (CN); Chuntao Wang, Nanjing (CN); Linjie Huang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/315,662

(22) Filed: May 10, 2021

(65) Prior Publication Data
US 2021/0359974 A1 Nov. 18, 2021

(30) Foreign Application Priority Data
May 12, 2020 (CN) .......................... 202010398647.X

(51) Int. Cl.
| | |
|---|---|
| *G06F 15/16* | (2006.01) |
| *G06F 9/54* | (2006.01) |
| *H04L 29/06* | (2006.01) |
| *H04L 101/604* | (2022.01) |
| *H04L 61/2517* | (2022.01) |
| *H04M 7/00* | (2006.01) |

(52) U.S. Cl.
CPC ...... *H04L 61/6004* (2013.01); *H04L 61/2517* (2013.01); *H04M 7/0063* (2013.01)

(58) Field of Classification Search
CPC ............ H04L 61/6004; H04L 61/2517; H04M 7/0063

USPC ......................................................... 709/245
See application file for complete search history.

(56) References Cited

U.S. PATENT DOCUMENTS

| | | | | |
|---|---|---|---|---|
| 9,477,718 | B2 * | 10/2016 | Zhou .................. | G06F 16/2465 |
| 2014/0188837 | A1 * | 7/2014 | Zhou .................. | G06F 16/2465 |
| | | | | 707/709 |

(Continued)

FOREIGN PATENT DOCUMENTS

| | | |
|---|---|---|
| CN | 110808919 A | 2/2020 |
| EP | 2482517 A1 | 8/2012 |

(Continued)

OTHER PUBLICATIONS

M. Elsaadawy, P. Basta, Y. Zheng, B. Kemme and M. Younis, "Flow-based Service Type Identification using Deep Learning," 2021 IEEE 7th International Conference on Network Softwarization (NetSoft), 2021, pp. 156-160, doi: 10.1109/NetSoft51509.2021. 9492663. (Year: 2021).*

(Continued)

*Primary Examiner* — Hamza N Algibhah
(74) *Attorney, Agent, or Firm* — Rimon PC

(57) ABSTRACT

Embodiments of this application disclose a service type determining method and a related device. A first device obtains a dataset, where the dataset includes at least two 5-tuples. The first device determines a target feature (the target feature is used to indicate a service type corresponding to a target triplet) corresponding to the target triplet based on the dataset. In this way, the first device can identify the service type corresponding to the target triplet based on the target feature, to facilitate operations such as packet transmission traffic control or application identification based on the importance indicated by the service type.

9 Claims, 9 Drawing Sheets

(56) References Cited

U.S. PATENT DOCUMENTS

| | | | | |
|---|---|---|---|---|
| 2021/0133601 A1* | 5/2021 | Welch | ............... | G06F 16/2255 |
| 2021/0135997 A1* | 5/2021 | Tigli | ............... | H04L 69/22 |
| 2021/0359974 A1* | 11/2021 | Li | ............... | H04L 45/74 |

FOREIGN PATENT DOCUMENTS

| | | | | |
|---|---|---|---|---|
| EP | 3016329 A1 | 5/2016 | | |
| WO | WO-2017113900 A1 * | 7/2017 | ............ | H04L 41/00 |
| WO | WO-2021147665 A1 * | 7/2021 | ............ | H04W 24/04 |

* cited by examiner

SERVICE TYPE DETERMINING METHOD AND RELATED DEVICE

CROSS-REFERENCE TO RELATED APPLICATION

This application claims priority to Chinese Patent Application No. 202010398647.X, filed on May 12, 2020, which is hereby incorporated by reference in its entirety.

TECHNICAL FIELD

This application relates to the communications field, and in particular, to a service type determining method and a related device.

BACKGROUND

With continuous development of communications technologies, in actual application, due to a limited load capability of a communications system, when microburst traffic (usually in video traffic) occurs, problems such as congestion and packet loss may be caused.

To ensure service quality, traffic control is required. Therefore, it is important to identify a traffic type and control traffic based on the type.

A conventional detection method determines the traffic type only based on a port number or a communications protocol at a transport layer. This is a good idea when all services use fixed port numbers. However, with the development of the Internet, more network applications start to use dynamic port numbers. As a result, the method of determining the traffic type based only on the port number or the communications protocol is not applicable.

SUMMARY

This application provides a service type determining method and a related device, to identify a traffic type corresponding to a triplet. A first device may perform an operation such as transmission control of a 5-tuple or application identification based on importance of a target feature in an actual scenario.

A first aspect of this application provides a service type determining method. The method includes: A first device obtains a dataset corresponding to a plurality of packets transmitted by a second device, where the dataset includes at least two 5-tuples. The at least two 5-tuples include a first 5-tuple, and the first 5-tuple includes a source address, a destination address, a source port, a destination port, and a communications protocol. The first device determines a target feature corresponding to a target triplet based on the dataset, where the target triplet includes an address, a port, and the communications protocol. The target feature is used to indicate a service type corresponding to the target triplet. That the address corresponds to the port includes: The address is the source address, and the port is the source port, or the address is the destination address, and the port is the destination port.

In this application, the first device obtains the dataset, where the dataset includes the at least two 5-tuples, and the first device determines the target feature (the target feature is used to indicate the service type corresponding to the target triplet) corresponding to the target triplet based on the dataset. In this way, the first device can identify the service type corresponding to the target triplet based on the target feature, to facilitate implementation of an operation such as packet transmission traffic control or application identification based on importance of the service type.

Optionally, in a possible implementation of the first aspect, the target feature in the foregoing step includes: a client-server (CS) mode, a peer-to-peer (P2P) mode, a port-same mode, a voice over Internet Protocol (VoIP) mode, an instant message mode, or a port reservation mode on both sides. The port-same mode indicates that a port number of the source port is the same as a port number of the destination port.

A plurality of features are defined to adapt to various packet transmission scenarios on a network, and meet service requirements in various network scenarios.

Optionally, in a possible implementation of the first aspect, the target feature in the foregoing step includes the CS mode or the P2P mode. That the first device determines a target feature corresponding to the target triplet based on the dataset includes: The first device determines a 5-tuple corresponding to the target triplet based on the dataset. The first device determines the target feature based on the corresponding 5-tuple.

In this possible implementation, the first device may specifically determine the target feature based on the corresponding 5-tuple to identify the service type, without depending on the port number or the communications protocol.

Optionally, in a possible implementation of the first aspect, the step in which the first device determines a target feature based on the corresponding 5-tuple includes: The first device determines that the target feature is the CS mode and that the port in the target triplet is a service port in the CS mode based on that a quantity of corresponding 5-tuples is greater than a first threshold and the port in the target triplet is a well-known port. The well-known port indicates that a value of the port is greater than or equal to 0 and is less than or equal to 1023.

In this possible implementation, the first device may identify whether the port in the target triplet is the service port in the CS mode based on the corresponding 5-tuple, to determine the service type of the triplet. This facilitates subsequent operations such as flow rate control.

Optionally, in a possible implementation of the first aspect, the foregoing step in which the first device determines the target feature corresponding to the target triplet based on the corresponding 5-tuple includes: The first device determines that the target feature corresponding to the target triplet is the P2P mode and that the service port is a service port in the CS mode or a service port in another mode based on a quantity of non-service ports included in the corresponding 5-tuple, a quantity of service ports included in the corresponding 5-tuple, and a port that is in the target triplet and that is not identified as a service port.

In this possible implementation, the first device may identify whether the port in the target triplet is a service port based on the corresponding 5-tuple. This facilitates subsequent operations such as flow rate control.

Optionally, in a possible implementation of the first aspect, the quantity of non-service ports is greater than a second threshold, and the quantity of service ports is greater than a third threshold in the foregoing step.

This possible implementation improves implementability of the solution.

Optionally, in a possible implementation of the first aspect, the foregoing step in which the first device determines a target feature corresponding to a target triplet based on the dataset includes: The first device obtains a quantity of peer ports based on the dataset, where the peer port is not a random port or a service port, and an address in the target triplet is not a client address. When the port in the triplet is the destination port, the peer port is the source port, or when the port in the triplet is the source port, the peer port is the destination port. The first device determines that the target feature includes the port reservation mode on both sides and that the port in the target triplet is a service port in the port reservation mode on both sides based on the quantity of peer ports.

In this possible implementation, the first device determines that the target feature includes the port reservation mode on both sides based on the quantity of peer ports, to control transmission of the 5-tuple or perform the operation such as the application identification.

Optionally, in a possible implementation of the first aspect, the quantity of peer ports in the foregoing step is greater than a fourth threshold.

This possible implementation improves implementability of the solution.

Optionally, in a possible implementation of the first aspect, the foregoing step in which the first device determines a target feature corresponding to a target triplet based on the dataset includes: The first device obtains an address quantity set of each port in the peer port based on the dataset, where the address quantity set includes a first value. When the port in the triplet is the destination port, the peer port is the source port. When the port in the triplet is the source port, the peer port is the destination port. The first device obtains a second value based on the address quantity set, where the second value is a sum of all values included in the address quantity set. The first device determines that the peer port is a service port in the instant message mode based on a first target ratio, where the first target ratio is a ratio of the first value to the second value.

In this possible implementation, the first device may specifically identify the instant message mode, which is a basis for subsequent rate limiting or the application identification.

Optionally, in a possible implementation of the first aspect, the peer port whose first target ratio is greater than a fifth threshold in the foregoing step is a service port in the instant message mode.

This possible implementation improves implementability of the solution.

Optionally, in a possible implementation of the first aspect, the foregoing step in which the first device determines a target feature corresponding to a target triplet based on the dataset includes: The first device obtains a third value, where the third value is a quantity of 5-tuples corresponding to a target 2-tuple. The target 2-tuple includes the port in the target triplet and the communications protocol. The first device determines a fourth value, where the fourth value is a quantity of 5-tuples whose source ports are the same as destination ports in the 5-tuple corresponding to the target 2-tuple in the dataset. The first device determines that the target feature is the VoIP mode and that the port in the triplet is a service port of the VoIP mode based on a relationship between a second target ratio and a sixth threshold, where the second target ratio is a ratio of the fourth value to the third value.

In this possible implementation, the first device may specifically identify the VoIP mode, which is a basis for subsequent rate limiting or the application identification.

Optionally, in a possible implementation of the first aspect, before the step in which the first device determines the target feature corresponding to the target triplet based on the corresponding 5-tuple, the method further includes: The first device determines whether to trigger a step of determining the target feature based on load information or a user instruction.

This possible implementation improves the implementability of the solution.

Optionally, in a possible implementation of the first aspect, the foregoing step further includes: The first device determines an application to which the target triplet belongs based on the target feature.

In this possible implementation, the first device may determine the application to which the target triplet belongs based on the target feature. This resolves a problem that is caused by untimely update and difficulty in identifying encrypted traffic by using database matching for the application identification.

Optionally, in a possible implementation of the first aspect, the foregoing step further includes: The first device sends a target message to the second device, where the target message includes the target triplet and a rate limiting message. The rate limiting message is used to indicate the second device to perform rate limiting control on a packet conforming to the target triplet.

In this possible implementation, the second device may perform the rate limiting control on the packet conforming to the target triplet based on the message of the first device, to optimize a network.

A second aspect of this application provides a first device, configured to perform the method in any one of the first aspect or the possible implementations of the first aspect. Specifically, the first device includes modules or units configured to perform the method in any one of the first aspect or the possible implementations of the first aspect.

A third aspect of this application provides a first device, and the first device performs the method in any one of the first aspect or the possible implementations of the first aspect.

A fourth aspect of this application provides a communications system. The communications system includes a first device and a second device, and the first device performs the method in any one of the first aspect or the possible implementations of the first aspect. The second device is configured to receive target information, and perform rate limiting control on a packet conforming to a target triplet based on rate limiting information. The target information includes the target triplet and the rate limiting information.

A fifth aspect of this application provides a computer storage medium. The computer storage medium stores an instruction. When the instruction is executed on a computer, the computer is enabled to perform the method according to any one of the first aspect or the possible implementations of the first aspect.

A sixth aspect of this application provides a computer program product. When the computer program product executes on a computer, the computer is enabled to perform the method according to any one of the first aspect or the possible implementations of the first aspect.

For technical effects brought by the second aspect, the third aspect, the fourth aspect, the fifth aspect, the sixth aspect, or any one of the possible implementations, refer to technical effects brought by the first aspect or the different possible implementations of the first aspect. Details are not described herein again.

DESCRIPTION OF EMBODIMENTS

An embodiment of this application provides a service type determining method, to identify a service type corresponding to a triplet. A first device performs an operation such as transmission control of a 5-tuple or application identification based on importance of a target feature in an actual scenario.

The data processing method provided in this application may be applied to different communications networks. The following uses an enterprise campus scenario as an example to describe the data processing method.

Figure 1:
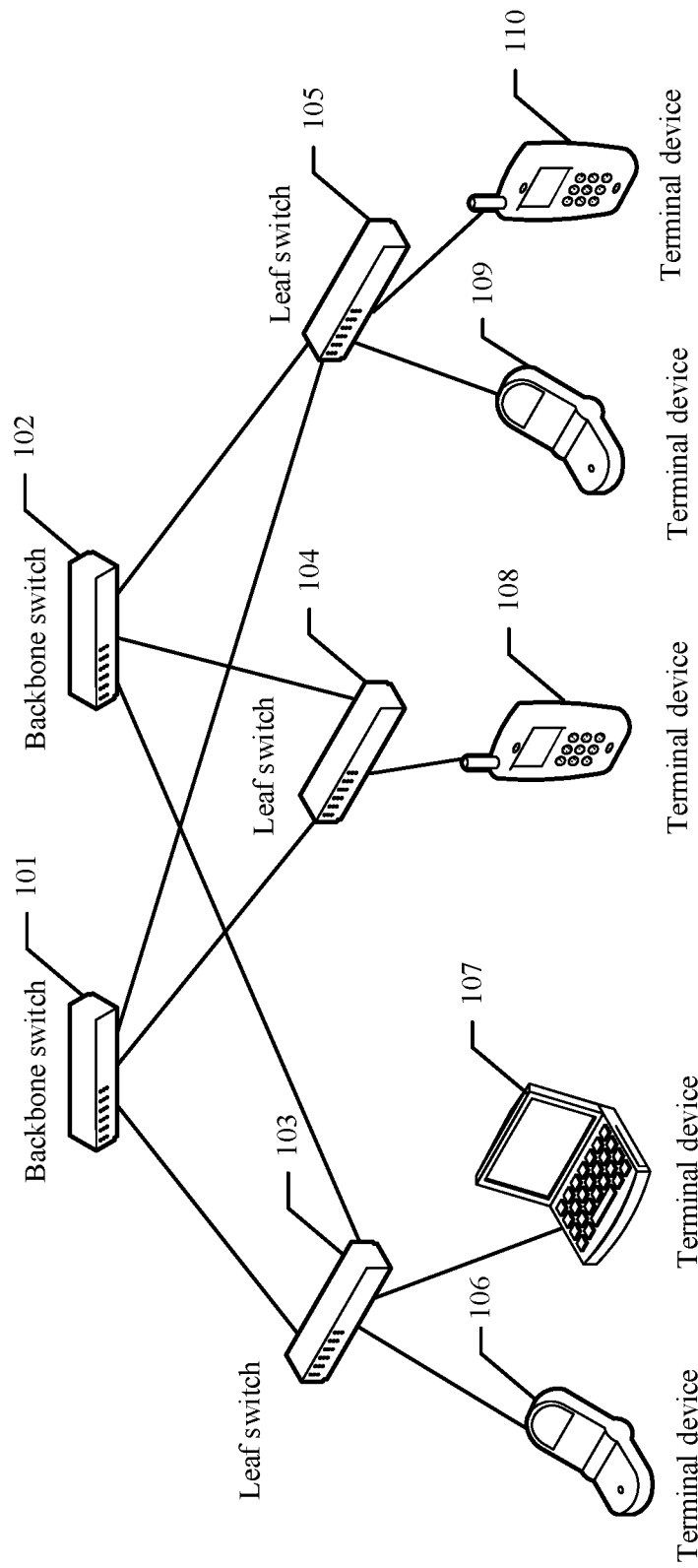
FIG. 1 is a schematic diagram of a network architecture according to an embodiment of this application.

Refer to FIG. 1. A network architecture in an embodiment of this application includes:

backbone switches 101 and 102, leaf switches 103 to 105, and terminal devices 106 to 110.

The backbone switch 101 is separately connected to the leaf switches 103 to 105, and the backbone switch 102 is separately connected to the leaf switches 103 to 105. The leaf switch 103 is separately connected to the terminal devices 106 and 107, the leaf switch 104 is connected to the terminal device 108, and the leaf switch 105 is separately connected to the terminal devices 109 and 110.

In this embodiment, only two backbone switches 101 and 102, three leaf switches 103 to 105, and five terminal devices 106 to 110 are used as an example for schematic description. In actual application, there may be more backbone switches, leaf switches, and terminal devices in the network architecture. This is not specifically limited herein.

A manner in which each terminal device accesses the leaf switch may also be different. The plurality of terminal devices 106 and 107 may access the leaf switch 103, or one terminal device 108 may access the leaf switch 104.

The backbone switch 101 and the leaf switches 103 to 105 are usually connected through a wired network, or may be connected through a wireless network. If the backbone switch 101 and the leaf switches 103 to 105 are connected through the wired network, a connection form may be a fiber network.

The leaf switch 103 is usually connected to the terminal devices 106 and 107 through the wireless network, or may be connected to the terminal devices 106 and 107 through the wired network. If the leaf switch 103 is connected to the terminal devices 106 and 107 through the wired network, a connection manner may be the fiber network. If the leaf switch 103 is connected to the terminal devices 106 and 107 through the wireless network, a connection manner may be a cellular wireless network, a Wi-Fi network, or a wireless network of another type.

Communication between the terminal devices may be performed by using the leaf switch, or may be performed by using the leaf switch and the backbone switch. Communication between the terminal devices may be a private cloud application, or may be a public cloud application. This is not specifically limited herein.

A main function of the backbone switches 101 and 102 is to ensure communication between any two leaf switches in a network.

A main function of the leaf switches 103 to 105 is data forwarding. The leaf switches 103 to 105 are connected to the backbone switch and the terminal device, and transmit data.

A main function of the terminal devices 106 to 110 is to provide a service for a user or another device.

In this embodiment of this application, the terminal device may be a device that provides voice or data connectivity for the user, for example, may be referred to as user equipment (UE), a mobile station, a subscriber unit, a station, or terminal equipment (TE), and the like. The terminal may be a cellular phone, a personal digital assistant (PDA), a wireless modem, a handheld device, a laptop computer, or a cordless phone, a wireless local loop (WLL) station, a tablet computer (pad), and the like. This is not specifically limited herein.

With development of wireless communications technologies, a device that can access a communications system, can communicate with a network side of a communications system, or can communicate with another object by using a communications system may be a terminal device in this embodiment of this application, such as a terminal in intelligent transportation, a household device in a car or a smart household, an electricity meter reading instrument in a smart grid, a voltage monitoring instrument, an environment monitoring instrument, a video surveillance instrument in an intelligent security network, or a cash register. In this embodiment of this application, the terminal may be static and fixed, or may be mobile.

There are a plurality of cases of the first device and the second device in this embodiment of this application.

Case 1: The first device is the leaf switch, and the second device is the terminal device.

Case 2: The first device is the backbone switch, and the second device is the leaf switch.

Case 3: The first device and the second device are a same device, for example, a same leaf switch.

There are the plurality of cases of the first device and the second device in this embodiment of this application. The first device in this embodiment of this application may be a switch, a router, a wireless router, a server, or the like, and the second device may be a device such as a switch, a router, or a wireless router. The foregoing three cases are merely examples, and are not specifically limited herein.

The following describes the data processing method in this embodiment of this application with reference to the network framework in FIG. 1.

Figure 2:
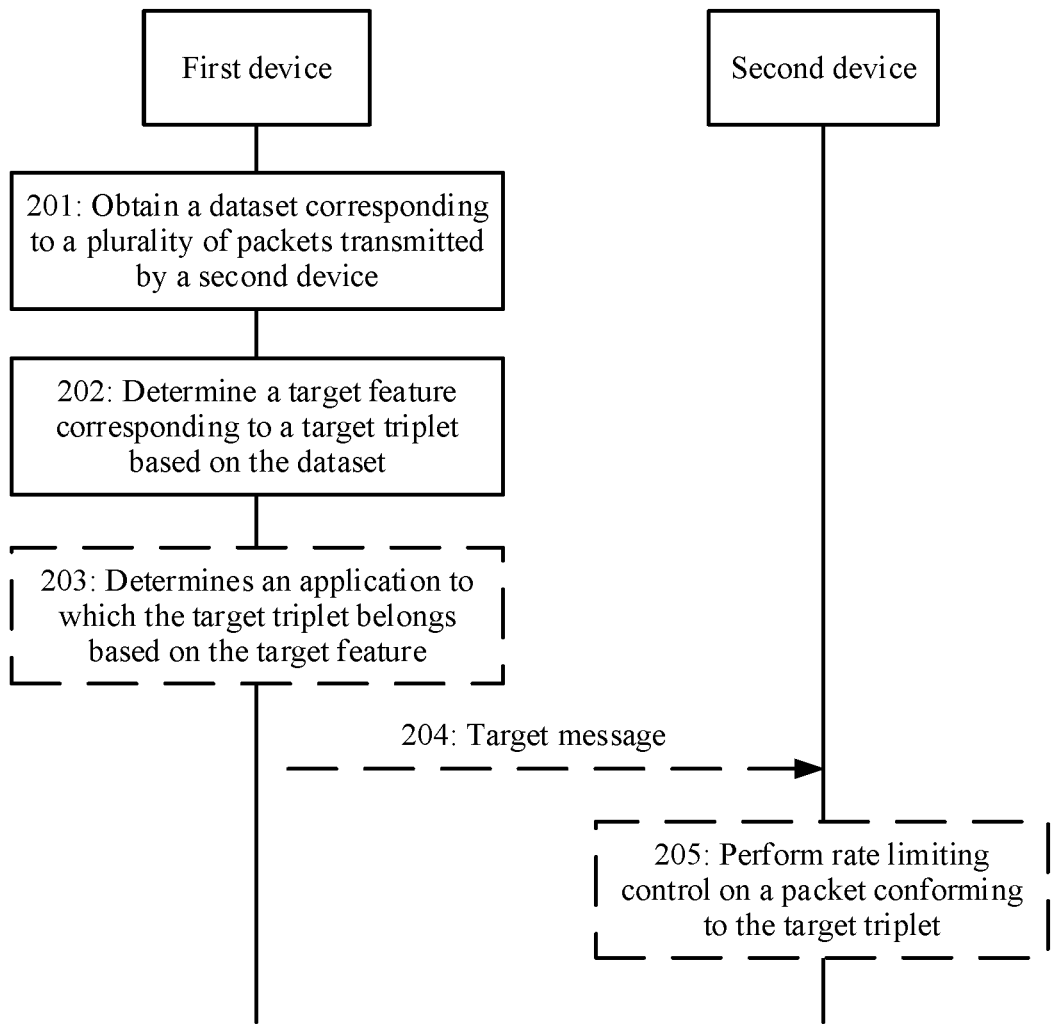
FIG. 2 is a schematic flowchart of a data processing method according to an embodiment of this application.

Refer to FIG. 2. An embodiment of a data processing method in an embodiment of this application includes the following steps.

201: A first device obtains a dataset corresponding to a plurality of packets transmitted by a second device.

The first device obtains the dataset corresponding to the plurality of packets transmitted by the second device, where the dataset includes at least two 5-tuples. The at least two 5-tuples include a first 5-tuple, and the first 5-tuple includes a source address, a source port, a destination address, a destination port, and a communications protocol.

There are a plurality of manners in which the first device obtains the dataset corresponding to the plurality of packets transmitted by the second device.

In an example, the first device is a server, and the dataset may be sent to the server for one or more times by configuring an output 5-tuple on the second device.

In another example, the first device is a backbone switch, and the second device is a switch that is closer to a network user side and that is connected to the first device. A manner of sending 5-tuple information to the first device may be configured on the second device. Alternatively, the 5-tuple information in the packet transmitted by the second device by using the first device may be configured on the first device to obtain the dataset.

The following uses Table 1 as the dataset obtained by the first device as an example for description.

TABLE 1

| No. | Source address | Source port | Destination address | Destination port | Communications protocol |
|---|---|---|---|---|---|
| 1 | ip_1 | port_i | ip_2 | port_i | 17 |
| 2 | ip_1 | port_i | ip_3 | port_i | 17 |
| 3 | ip_4 | port_1 | ip_5 | port_i | 17 |
| 4 | ip_6 | port_2 | ip_7 | port_3 | 6 |
| 5 | ip_7 | port_3 | ip_6 | port_2 | 6 |
| 6 | ip_8 | port_4 | ip_7 | port_3 | 6 |
| 7 | ip_8 | port_5 | ip_7 | port_3 | 6 |
| 8 | ip_7 | port_3 | ip_8 | port_4 | 6 |
| 9 | ip_7 | port_3 | ip_8 | port_5 | 6 |
| 10 | ip_9 | port_6 | ip_10 | port_7 | 17 |
| 11 | ip_9 | port_6 | ip_10 | port_7 | 17 |
| 12 | ip_10 | port_7 | ip_9 | port_6 | 17 |
| 13 | ip_11 | port_8 | ip_12 | port_9 | 17 |
| 14 | ip_13 | port_8 | ip_12 | port_9 | 17 |
| 15 | ip_12 | port_9 | ip_11 | port_8 | 17 |
| 16 | ip_12 | port_9 | ip_13 | port_8 | 17 |
| 17 | ip_14 | port_10 | ip_15 | port_13 | 17 |
| 18 | ip_14 | port_11 | ip_15 | port_13 | 17 |
| 19 | ip_14 | port_12 | ip_15 | port_13 | 17 |
| 20 | ip_15 | port_13 | ip_14 | port_10 | 17 |
| 21 | ip_15 | port_13 | ip_14 | port_11 | 17 |
| 22 | ip_15 | port_13 | ip_14 | port_12 | 17 |
| 23 | ip_16 | port_14 | ip_17 | port_14 | 17 |
| 24 | ip_16 | port_14 | ip_17 | port_14 | 17 |
| 25 | ip_16 | port_14 | ip_17 | port_14 | 17 |
| 26 | ip_17 | port_14 | ip_16 | port_14 | 17 |
| 27 | ip_18 | port_15 | ip_19 | port_14 | 17 |
| 28 | ip_19 | port_14 | ip_18 | port_15 | 17 |
| 29 | ip_20 | port_16 | ip_17 | port_14 | 17 |
| 30 | ip_17 | port_14 | ip_20 | port_16 | 17 |
| 31 | ip_21 | port_14 | ip_19 | port_14 | 17 |
| 32 | ip_21 | port_14 | ip_19 | port_14 | 17 |
| 33 | ip_19 | port_14 | ip_21 | port_14 | 17 |
| ... | ... | ... | ... | ... | ... |

Content included in the 5-tuple and a quantity of 5-tuples included in the dataset in Table 1 are merely examples. In actual application, the dataset may include more or fewer 5-tuples, and the content included in the 5-tuple and generation time may be different or the same. This is not specifically limited herein.

Certainly, specific numbers of the source address, the source port, the destination address, the destination port, and the communications protocol in Table 1 are not limited herein. Communications protocols in Table 1 are merely described by using 17 and 6 as an example. The communications protocol 17 indicates that the communications protocol is a User Datagram Protocol (UDP), and the communications protocol 6 indicates that the communications protocol is a Transmission Control Protocol (TCP).

202: The first device determines a target feature corresponding to a target triplet based on the dataset.

After obtaining the dataset, the first device determines the target triplet (which may also be referred to as a service). The target triplet includes an address, a port, and the communications protocol. The address corresponds to the port. The address is the source address and the port is the source port, or the address is the destination address and the port is the destination port. In other words, in this embodiment of this application, there are two cases of the target triplet, which are as follows:

1. The target triplet includes the source address, the source port, and the communications protocol.

2. The target triplet includes the destination address, the destination port, and the communications protocol.

To be specific, when the port in the target triplet is the source port, a peer port is the destination port. When the port in the target triplet is the destination port, the peer port is the source port.

After determining the target triplet, the first device determines the target feature corresponding to the target triplet. The target feature includes one or more of a client-server (CS) mode, a peer-to-peer (P2P) mode, a port-same mode, a voice over Internet Protocol (VoIP) mode, an instant message mode, or a port reservation mode on both sides. The port-same mode indicates that a port number of the source port is the same as a port number of the destination port.

In this embodiment of this application, there are the plurality of manners in which the first device identifies the target feature corresponding to the target triplet. The following separately describes the manners.

1. The first device identifies whether the target triplet is the CS mode.

The first device determines that the target feature is the CS mode and that the port in the target triplet is a service port in the CS mode based on that a quantity of corresponding 5-tuples is greater than a first threshold and the port in the target triplet is a well-known port.

In this embodiment of this application, the corresponding 5-tuple is a 5-tuple including the target triplet.

Figure 3:
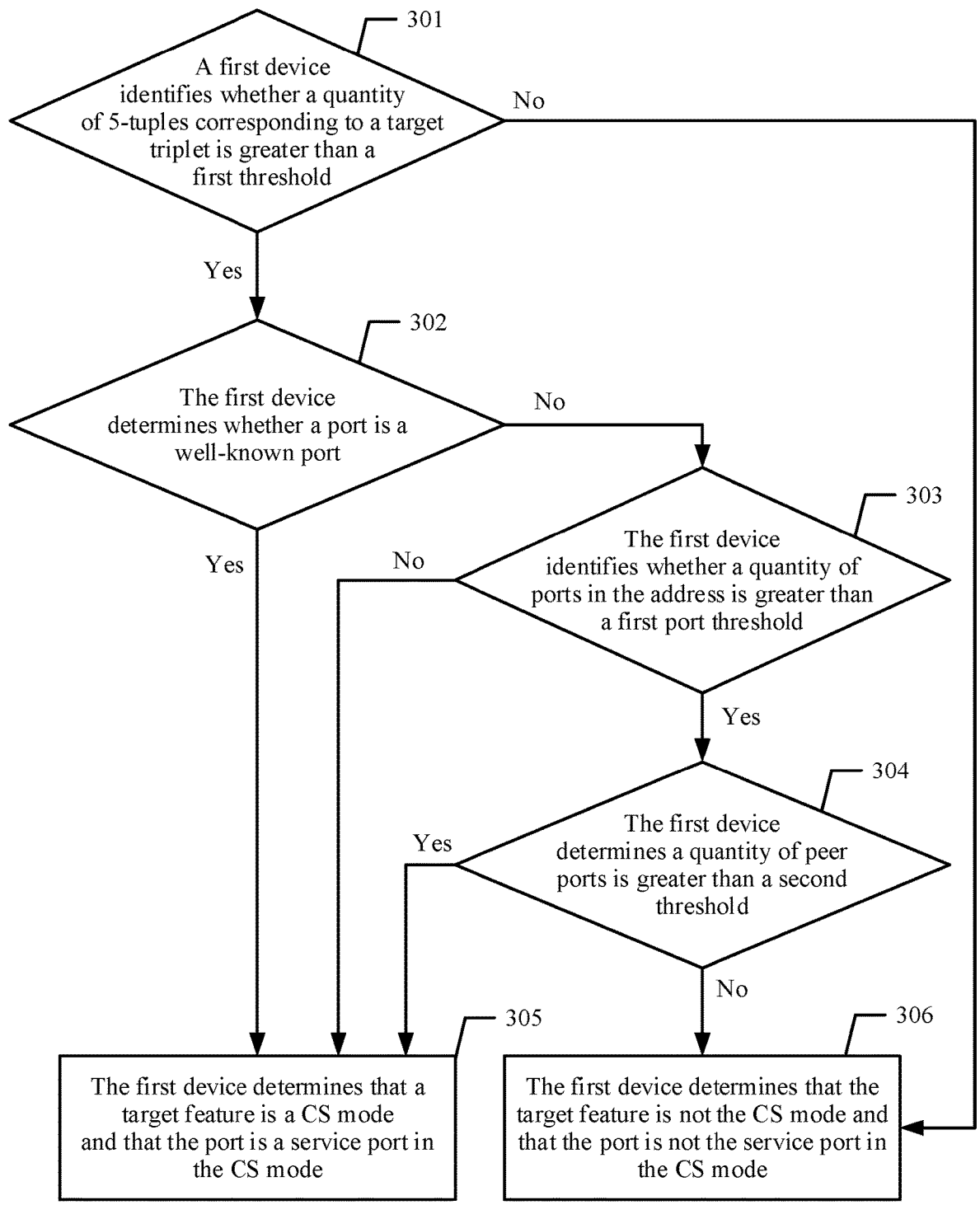
FIG. 3 is a specific schematic flowchart in which a first device identifies whether a target triplet is a CS mode according to an embodiment of this application.

As shown in FIG. 3, a specific process in which the first device identifies whether the target triplet is the CS mode may include the following steps.

301: The first device determines whether the quantity of 5-tuples corresponding to the target triplet is greater than the first threshold. If yes, perform step 302. If no, perform step 306.

The first device determines the quantity of 5-tuples corresponding to the target triplet based on the dataset, and then determines whether the quantity is greater than the first threshold. If the quantity is greater than or equal to the first threshold, step 302 is performed. If the quantity is less than the first threshold, step 306 is performed. Certainly, if the quantity is greater than the first threshold, step 302 is performed. If the quantity is less than or equal to the first threshold, step 306 is performed. This is not specifically limited herein.

The first threshold in this embodiment of this application is set based on a requirement. The first threshold may be 15, 20, or the like. This is not specifically limited herein.

For example, as shown in Table 1, if the target triplet includes ip_7, port_3, and the communications protocol 6, in this case, the quantity of 5-tuples corresponding to the target triplet is 6 (from No. 4 to No. 9). If the target triplet includes ip_1, port_1, and the communications protocol 17, in this case, the quantity of 5-tuples corresponding to the target triplet is 2 (No. 1 and No. 2).

302: The first device determines whether the port of the target triplet is the well-known port. If yes, perform step 305. If no, perform step 303.

When a determining result in step 301 is yes, this step is performed.

The first device determines whether the port of the target triplet is the well-known port. If yes, step 305 is performed. If no, step 303 is performed. Specifically, it may be determined whether a value of the port of the target triplet is greater than or equal to 0 and is less than or equal to 1023. If yes, the first device determines that the port is the well-known port.

303: The first device determines whether a quantity of ports in the address is greater than a first port threshold. If yes, perform step 304. If no, perform step 305.

When a determining result in step 302 is no, this step is performed.

The first device determines whether the quantity of ports of the address exceeds the first port threshold. If yes, step 304 is performed. If no, step 305 is performed. The first port threshold is set based on a requirement. The first port threshold may be 10 or another value. This is not specifically limited herein.

304: The first device determines whether a quantity of peer ports is greater than a second port threshold. If yes, perform step 305. If no, perform step 306.

When a determining result in step 303 is yes, this step is performed.

The first device determines whether the quantity of peer ports exceeds the second port threshold. If yes, perform step 305. If no, perform step 306. The second port threshold is set based on a requirement. The second port threshold may be 10 or another value. This is not specifically limited herein.

305: The first device determines that the target feature corresponding to the target triplet is the CS mode and that the port in the target triplet is the service port in the CS mode.

This step can be triggered in a plurality of manners, which are described as follows:

1. When the determining result in step 302 is yes, this step is performed.

In other words, when the port is the well-known port, a probability that the port is the service port is higher.

2. When the determining result in step 303 is no, this step is performed.

In other words, a quantity of ports that are opened by a server address is limited. When the quantity of ports is limited, the probability that the port is the service port is higher.

3. When a determining result in step 304 is yes, this step is performed.

In other words, the more the ports are accessed, the more likely the port is used as the service port in the CS mode.

306: The first device determines that the target feature is not the CS mode and that the port is not the service port in the CS mode.

This step can be triggered in a plurality of manners, which are described as follows:

1. When the determining result in step 304 is no, this step is performed.

In other words, the fewer the ports are accessed, the more likely the port is used as the service port in the CS mode.

2. When the determining result in step 301 is no, this step is performed.

A smaller quantity of accessed target triplets indicates a higher probability that the port in the target triplet is not the service port in the CS mode.

FIG. 3 is merely an example. The first device may identify whether the target triplet is the CS mode in another manner. This is not specifically limited herein.

2. The first device identifies whether the target triplet is the P2P mode.

The first device determines that the target feature corresponding to the target triplet is a service port in the P2P mode based on a quantity of non-service ports included in the corresponding 5-tuple, a quantity of service ports included in the corresponding 5-tuple, and a port that is in the target triplet and that is not identified as a service port.

Figure 4:
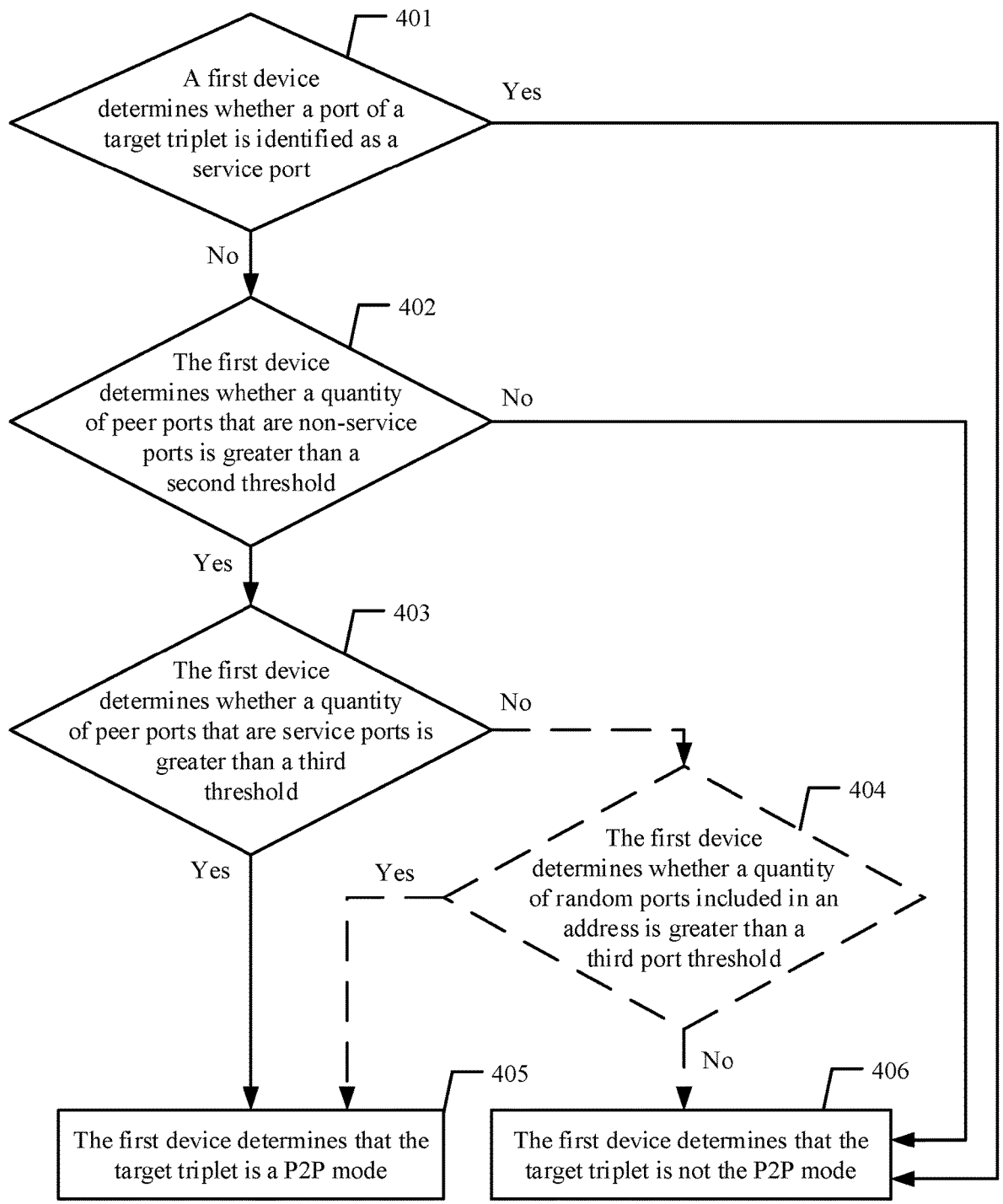
FIG. 4 is a specific schematic flowchart in which a first device identifies whether a target triplet is a P2P mode according to an embodiment of this application.

As shown in FIG. 4, a specific process in which the first device identifies whether the target triplet is the P2P mode may include the following steps:

401: The first device determines whether the port of the target triplet is a well-known port. If yes, perform step 406. If no, perform step 402.

The first device determines whether the port of the target triplet is identified as the service port. If no, step 402 is performed. In other words, the port is not identified as the service port in the CS mode or another mode. If yes, perform step 406. To be specific, if the port of the triplet is identified as the service port, at least one of a source end and a peer end is the server. Therefore, the P2P mode is not used.

402: The first device determines whether a quantity of peer ports that are non-server ports is greater than a second threshold. If yes, perform step 403. If no, perform step 406.

When a determining result in step 401 is no, this step is performed.

When the port in the target triplet is the source port, the peer port is the destination port. When the port in the target triplet is the destination port, the peer port is the source port.

The first device determines whether the quantity of the peer ports that are non-server ports is greater than the second threshold. If yes, perform step 403. If no, perform step 406. The quantity is the quantity of non-server ports in the dataset. The second threshold is set based on a requirement. The second threshold may be 10 or another value. This is not specifically limited herein.

403: The first device determines whether a quantity of peer ports that are server ports is greater than a third threshold. If yes, perform step 405. If no, perform step 404.

When a determining result in step 402 is yes, this step is performed.

The first device determines whether the quantity of peer ports that are server ports is greater than the third threshold. If yes, perform step 405. Optionally, if no, perform step 404. The third threshold is set based on a requirement. This is not specifically limited herein.

404: The first device determines whether a quantity of random ports included in the address is greater than a third port threshold. If yes, perform step 405. If no, perform step 406.

Optionally, when a determining result in step 403 is no, this step is performed.

The first device determines whether the quantity of random ports included in the address is greater than the third port threshold. If yes, perform step 405. If no, perform step 406. The third port threshold is set based on a requirement. The third port threshold may be 10 or another value. This is not specifically limited herein.

405: The first device determines that the target triplet is the P2P mode.

This step can be triggered in a plurality of manners, which are described as follows:

1. When the determining result in step 403 is yes, this step is performed.

In other words, if a quantity of data transmitted between the port of the target triplet and the non-server port is greater than the second threshold, there is a high probability that the port is a client port. Then, it is determined that the quantity of data transmitted between the port of the target triplet and the server port is greater than the third threshold, and there is the high probability that the port is the client port. In other words, a probability that the target triplet is the P2P mode is higher.

2. When a determining result in step 404 is yes, this step is performed.

In other words, the smaller the quantity of random ports included in the address, the higher a probability that the address is used as a server address.

406: The first device determines that the target triplet is not the P2P mode.

1. When the determining result in step 401 is yes, this step is performed.

In other words, if the port of the triplet is identified as the service port, at least one of the source end and the peer end is the server. Therefore, the P2P mode is not used.

2. When the determining result in step 402 is no, this step is performed.

In other words, the port of the target triplet seldom interacts with a client, and the port is probably not the client port (or a quantity of access times of the target triplet is too small, and the target triplet is not considered as a service).

3. When the determining result in step 404 is no, this step is performed.

In other words, the port of the target triplet seldom interacts with the server, and the port is probably not the client port (or the quantity of access times of the target triplet is too small, and the target triplet is not considered as the service).

FIG. 4 is merely an example. The first device may identify whether the target triplet is the P2P mode in another manner. This is not specifically limited herein.

3. The first device identifies whether the target triplet is the port-same mode.

Figure 5:
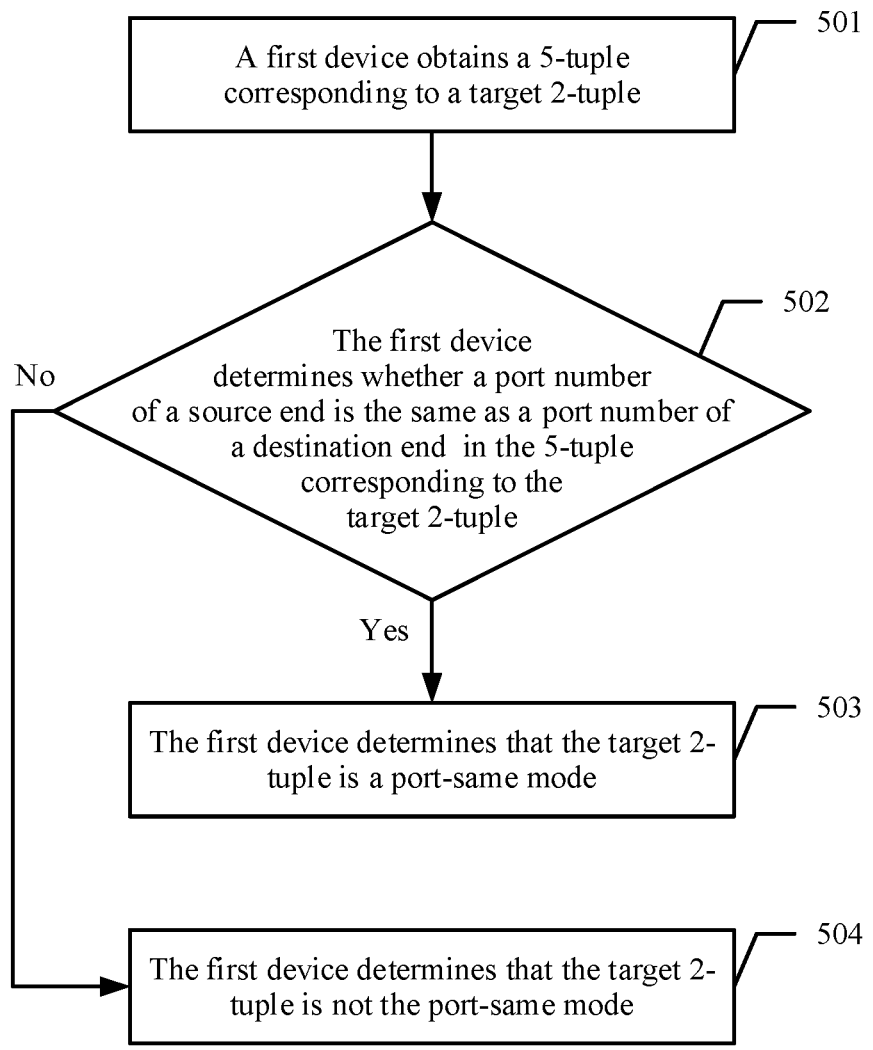
FIG. 5 is a specific schematic flowchart in which a first device identifies whether a target triplet is a port-same mode according to an embodiment of this application.

As shown in FIG. 5, a specific process in which the first device identifies whether the target triplet is the port-same mode may include the following steps.

501: The first device obtains a 5-tuple corresponding to a target 2-tuple.

The first device obtains the 5-tuple corresponding to the target 2-tuple. The target 2-tuple includes the port in the target triplet and the communications protocol.

For example, as shown in Table 1, if the target 2-tuple includes the port_3 and the communications protocol 6, in this case, the 5-tuple corresponding to the target 2-tuple is No. 4 to No. 9 in Table 1. If the target 2-tuple includes port_1 and the communications protocol 17, in this case, the target 2-tuple is No. 1 to No. 3 in Table 1.

502: The first device determines whether a port number of a source end is the same as a port number of a destination end in the 5-tuple corresponding to the target 2-tuple. If yes, perform step 503. If no, perform step 504.

The first device determines whether the port number of the source end is the same as the port number of the destination end in the 5-tuple corresponding to the target 2-tuple. If the port numbers are the same, step 503 is performed. If the port numbers are different, step 504 is performed.

503: The first device determines that the target 2-tuple is the port-same mode.

When a determining result in step 502 is yes, this step is performed. The first device determines that the target 2-tuple is the port-same mode.

For example, as shown in Table 1, if the target 2-tuple includes port_1 and the communications protocol 17, No. 1 to No. 3 in Table 1 are the port-same mode.

504: The first device determines that the target 2-tuple is not the port-same mode.

When the determining result in step 502 is yes, this step is performed. The first device determines that the target 2-tuple is not the port-same mode.

For example, as shown in Table 1, if the target 2-tuple includes port_3 and the communications protocol 6, the target 2-tuple is not the port-same mode.

FIG. 5 is merely an example. The first device may identify whether the target triplet is the port-same mode in another manner. This is not specifically limited herein.

4. The first device identifies whether the target triplet is the port reservation mode on both sides.

The first device obtains a quantity of peer ports based on the dataset, where the peer port is not a random port or a service port, and an address in the target triplet is not a client address. The first device determines that the target feature includes the port reservation mode on both sides and that the port in the target triplet is a service port in the port reservation mode on both sides based on the quantity of peer ports. The quantity of peer ports includes a quantity of 5-tuples with a same peer port in the dataset.

Figure 6:
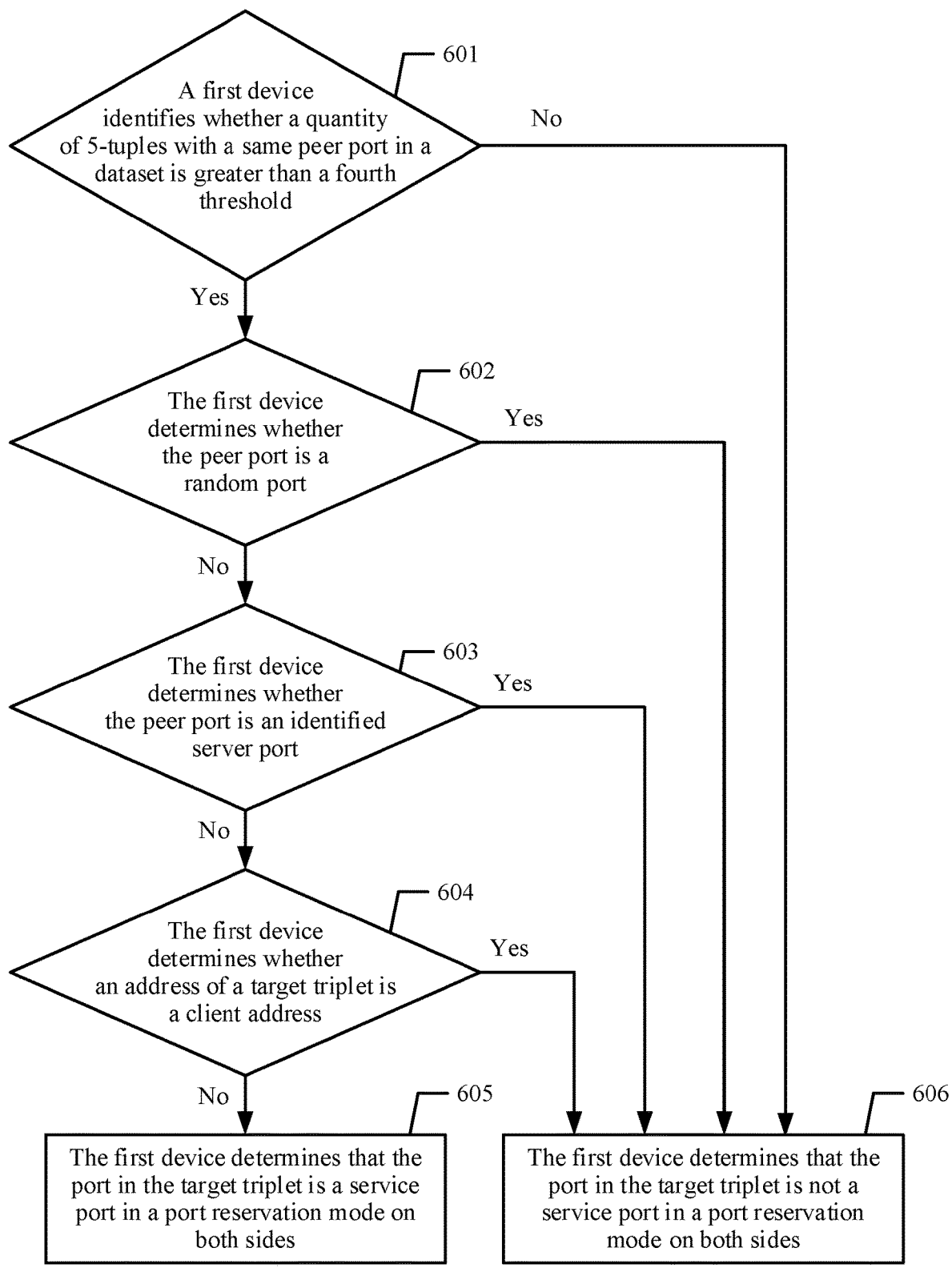
FIG. 6 is a specific schematic flowchart in which a first device identifies whether a target triplet is a port reservation mode on both sides according to an embodiment of this application.

As shown in FIG. 6, a specific process in which the first device identifies whether the target triplet is the port reservation mode on both sides may include the following steps.

601: The first device determines whether the quantity of 5-tuples with the same peer port in the dataset is greater than a fourth threshold. If yes, perform step 602. If no, perform step 606.

If the quantity of 5-tuples with the same peer port is greater than the fourth threshold, the first device may determine that the target feature includes the port reservation mode on both sides. The fourth threshold is set based on a requirement. This is not specifically limited herein.

In other words, the more peer ports that access the target triplet are the same, the higher a probability that the target triplet is the port reservation mode on both sides.

For example, the first device determines that a quantity of 5-tuples whose peer port is 1 in the target triplet is 20 (in other words, a quantity of target triplets accessed by the peer port 1 is 20). Assuming that the fourth threshold is 15, the first device determines that the target feature includes the port reservation mode on the two sides and that the port in the target triplet is the service port in the port reservation mode on the two sides.

The first device determines whether the quantity of 5-tuples with the same peer port in the dataset is greater than the fourth threshold. If yes, step 602 is performed. If no, performs step 606 is performed.

602: The first device determines whether the peer port is the random port. If yes, perform step 606. If no, perform step 603.

To ensure accuracy of a final determining result, the first device may further determine whether the peer port is the random port. If yes, step 606 is performed. If no, step 603 is performed. In other words, that the peer port is the random port indicates that the target triplet is accessed by the random port, and there is a high probability that the port of the target triplet is not the service port.

603: The first device determines whether the peer port is an identified server port. If yes, perform step 606. If no, perform step 604.

To ensure the accuracy of the final determining result, the first device may further determine whether the peer port is the identified server port. If the first device has identified another target feature of the target triplet before, in other words, the first device identifies that the port of the target triplet is a service port in another mode, in this case, it is determined that the port is not the service port in the port reservation mode on both sides.

604: The first device determines whether the address of the target triplet is the client address. If yes, perform step 606. If no, perform step 605.

The first device determines whether the address of the target triplet is the client address. If yes, step 606 is performed. If no, step 605 is performed. In other words, if the address of the target triplet is not the client address, there is a high probability that the address is a server address. If the address of the target triplet is the client address, a port corresponding to the address is not the service port either.

605: The first device determines that the port in the target triplet is the service port in the port reservation mode on both sides.

When a determining result in step 604 is no, this step is performed.

In other words, the peer port is not the random port or the service port, and the address in the target triplet is not the client address. In addition, if the quantity of 5-tuples with the same peer port is greater than the fourth threshold, the first device determines that the target feature includes the port reservation mode on both sides (namely, the target triplet is the port reservation mode on both sides) and that the port in the target triplet is the service port in the port reservation mode on both sides.

606: The first device determines that the port in the target triplet is not the service port in the port reservation mode on both sides.

This step can be triggered in a plurality of manners, which are described as follows:

1. When a determining result in step 601 is no, this step is performed.

In other words, the fewer the peer ports that access the target triplet are the same, the lower the probability that the target triplet is the port reservation mode on both sides.

2. When a determining result in step 602 is yes, this step is performed.

In other words, that the peer port is the random port indicates that the target triplet is accessed by the random port, and there is the high probability that the port of the target triplet is not the service port.

3. When a determining result in step 603 is yes, this step is performed.

In other words, the first device identifies that the port of the target triplet is the service port in the other mode, in this case, it is determined that the port is not the service port in the port reservation mode on both sides.

4. When the determining result in step 604 is yes, this step is performed.

In other words, if the address of the target triplet is not the client address, there is the high probability that the address is the server address.

FIG. 6 is merely an example. The first device may identify whether the target triplet is the port reservation mode on both sides in another manner. This is not specifically limited herein.

5. The first device identifies whether the target triplet is the instant message mode.

The first device obtains an address quantity set of each port in the peer port based on the dataset, where the address quantity set includes a first value. The first device obtains a second value based on the address quantity set, where the second value is a sum of all values included in the address quantity set. The first device determines that the peer port is a service port in the instant message mode based on a first target ratio (namely, a ratio of the first value to the second value).

Figure 7:
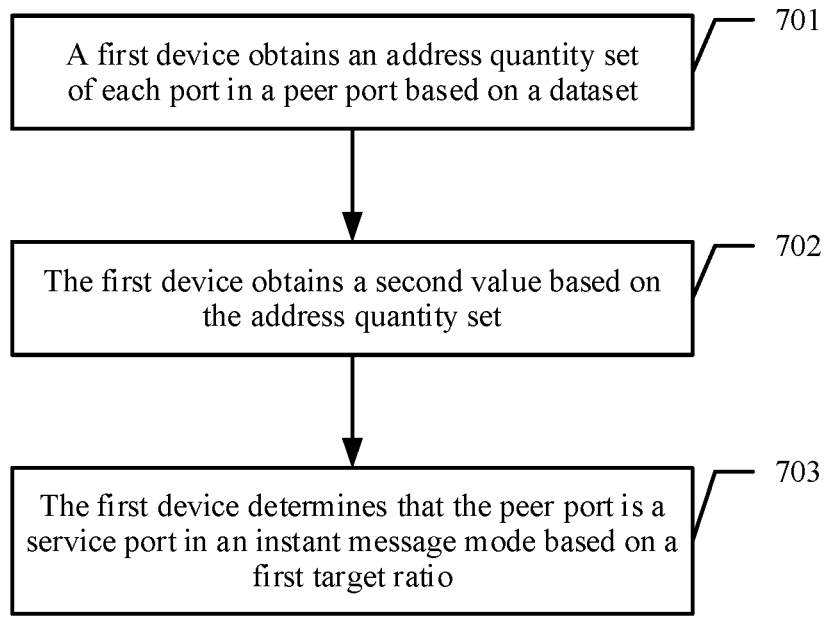
FIG. 7 is a specific schematic flowchart in which a first device identifies whether a target triplet is an instant message mode according to an embodiment of this application.

As shown in FIG. 7, a specific process in which the first device identifies whether the target triplet is the instant message mode may include the following steps.

701: The first device obtains the address quantity set of each port in the peer port based on the dataset.

When the port in the target triplet is the source port, the peer port is the destination port. When the port in the target triplet is the destination port, the peer port is the source port.

The first device obtains the address quantity set of each port in the peer port based on the dataset, where the address quantity set includes the first value.

For example, if the peer end has two ports: a first port and a second port, where the first port has two addresses, and the second port has three addresses, the first value is 2 or 3.

702: The first device obtains the second value based on the address quantity set.

The first device obtains the second value based on the address quantity set, where the second value is the sum of all the values included in the address quantity set.

For example, the example in step 701 is still used, and the second value is 5 (namely, a sum of 2 and 3).

703: The first device determines that the peer port is the service port in the instant message mode based on the first target ratio.

The first device obtains the first target ratio, where the first target ratio is the ratio of the first value to the second value.

Optionally, if the first target ratio is greater than a fifth threshold, the first device determines that the peer port is the service port in the instant message mode.

For example, the examples in step 701 and step 702 are still used, in this case, the first target ratio is 0.4 or 0.6. Assuming that the fifth threshold is 0.5, the first device determines that the second port of the peer end is the service port in the instant message mode.

FIG. 7 is merely an example. The first device may identify whether the target triplet is the instant message mode in another manner. This is not specifically limited herein.

6. The first device identifies whether the target triplet is the VoIP mode.

The first device obtains a third value, where the third value is a quantity of 5-tuples corresponding to a target 2-tuple. The target 2-tuple includes the port in the target triplet and the communications protocol. The first device determines a fourth value, where the fourth value is a quantity of 5-tuples whose source ports are the same as destination ports in the 5-tuple corresponding to the target 2-tuple in the dataset. The first device determines that the target feature is the VoIP mode and that the port in the triplet is a service port in the VoIP mode based on a relationship between a second target ratio (namely, a ratio of the fourth value to the third value) and a sixth threshold.

Figure 8:
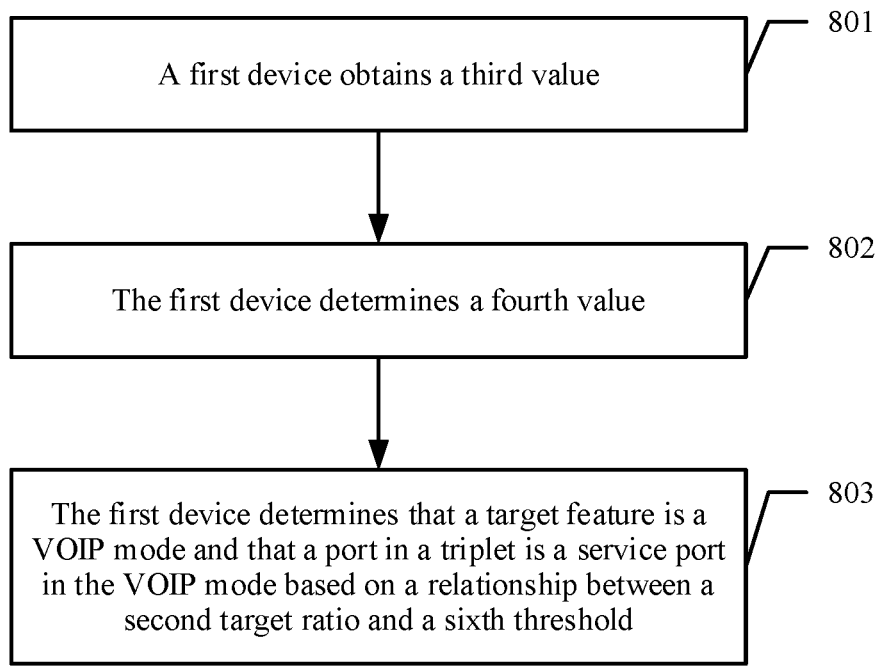
FIG. 8 is a specific schematic flowchart in which a first device identifies whether a target triplet is a VoIP mode according to an embodiment of this application.

As shown in FIG. 8, a specific process in which the first device identifies whether the target triplet is the VoIP mode may include the following steps.

801: The first device obtains the third value.

The first device obtains the quantity of 5-tuples corresponding to the target 2-tuple. The target 2-tuple includes the port in the target triplet and the communications protocol.

802: The first device obtains the fourth value.

The first device determines the quantity (namely, the fourth value) of 5-tuples whose source ports are the same as the destination ports in the 5-tuple corresponding to the target 2-tuple in the dataset.

803: The first device determines that the target feature is the VoIP mode and that the port in the triplet is the service port in the VoIP mode based on the relationship between the second target ratio and the sixth threshold.

The first device obtains the second target ratio, where the second target ratio is the ratio of the fourth value to the third value.

Optionally, if the second target ratio is greater than the sixth threshold, the first device determines that the port in the target triplet is the service port in the VoIP mode (in other words, the first device determines that the target feature includes the VoIP mode).

In other words, a higher proportion of a quantity of 5-tuples with a same source port and a same destination port in the quantity of 5-tuples corresponding to the target 2-tuple indicates a higher probability that the target triplet is the VoIP mode.

FIG. 8 is merely an example. The first device may identify whether the target triplet is the VoIP mode in another manner. This is not specifically limited herein.

In this embodiment of this application, the first device identifies the target feature corresponding to the target triplet in the plurality of manners. The foregoing five manners are merely examples. This is not limited herein.

Optionally, the target feature that is corresponding to the target triple and that is determined by the first device may be the target feature obtained as shown in Table 2.

TABLE 2

| Address | Port | Communications protocol | Target feature |
|---------|------|------------------------|----------------|
| —       | port_1 | 17 | Port-same mode |
| ip_9    | port_6 | 17 | P2P mode |
| ip_10   | port_7 | 17 | P2P mode |
| ip_7    | port_3 | 6  | CS mode |
| ip_12   | port_9 | 17 | Instant message mode |
| ip_17   | port_14 | 17 | VoIP mode |
| ip_19   | port_14 | 17 | VoIP mode |
| ip_15   | port_13 | 17 | Port reservation mode on both sides |
| ...     | ...    | ... | ... |

Content included in the target triplet and the corresponding target feature in Table 2 are merely examples. In actual application, the content included in the target triplet and generation time may be different or the same. This is not specifically limited herein.

203: The first device determines an application to which the target triplet belongs based on the target feature.

Optionally, after determining the target feature corresponding to the target triplet, the first device may cluster the target triplet with the target feature by using a clustering algorithm (for example, a conventional data analysis algorithm, a machine learning algorithm, or a deep learning algorithm), and output a clustering result. Applications are differentiated based on the clustering result.

For example, the clustering result is shown in Table 3.

TABLE 3

| Service address | Service port | Communications protocol | App ID |
|-----------------|--------------|------------------------|--------|
| ip_9  | port_6  | 17 | 1 |
| ip_10 | port_7  | 17 | 1 |
| ip_17 | port_14 | 17 | 2 |
| ip_19 | port_14 | 17 | 2 |
| ip_7  | port_3  | 6  | 3 |
| ip_12 | port_9  | 17 | 3 |
| ...   | ...     | ... | ... |

The content included in the target triplet and the application to which the target triplet belongs in Table 3 are merely examples. This is not specifically limited herein.

204: The first device sends a target message to the second device.

Optionally, the first device may send the target message to the second device, where the target message includes the target triplet and a rate limiting message. The rate limiting message is used to indicate the second device to perform rate limiting control on a packet conforming to the target triplet.

205: The second device performs the rate limiting control on the packet conforming to the target triplet.

Optionally, after receiving the rate limiting message, the second device performs the rate limiting control on the packet conforming to the target triplet. A specific compliance situation is set based on an actual requirement. This is not specifically limited herein.

In this embodiment of this application, the first device obtains the dataset, where the dataset includes the at least two 5-tuples, and the first device determines the target feature (the target feature is used to indicate a service type corresponding to the target triplet) corresponding to the target triplet based on the dataset. In this way, the first device can identify the service type corresponding to the target triplet based on the target feature, to facilitate implementation of an operation such as transmission control of a 5-tuple or application identification based on importance of the target feature in an actual scenario.

Figure 9:
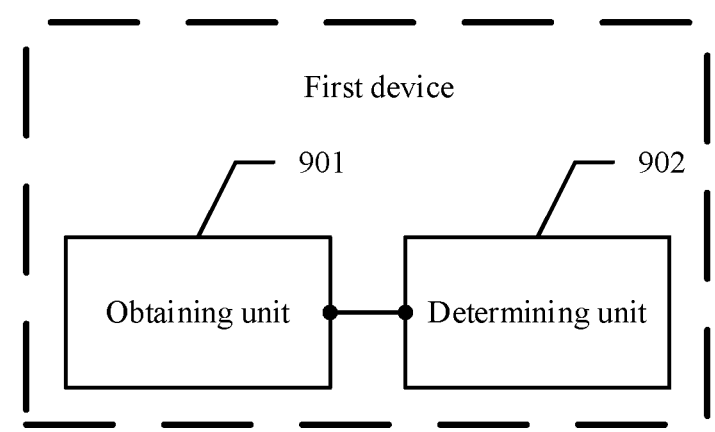
FIG. 9 is a schematic diagram of a structure of a first device according to an embodiment of this application.

The foregoing describes the data processing method in the embodiments of this application. The following describes a first device in the embodiments of this application. Referring to FIG. 9, an embodiment of the first device in the embodiments of this application includes:

an obtaining unit 901, configured to obtain a dataset corresponding to a plurality of packets transmitted by a second device, where the dataset includes at least two 5-tuples, the at least two 5-tuples include a first 5-tuple, and the first 5-tuple includes a source address, a destination address, a source port, a destination port, and a communications protocol; and a determining unit 902, configured to determine a target feature corresponding to a target triplet based on the dataset, where the target triplet includes an address, a port, and the communications protocol, and the target feature is used to indicate a service type corresponding to the target triplet.

That the address corresponds to the port includes: The address is the source address and the port is the source port, or the address is the destination address and the port is the destination port.

In this embodiment, operations performed by the units in the first device are similar to those described in the embodiments shown in FIG. 2 to FIG. 8. Details are not described herein again.

In this embodiment of this application, the obtaining unit 901 obtains the dataset, where the dataset includes the at least two 5-tuples, and the determining unit 902 determines the target feature (the target feature is used to indicate the service type corresponding to the target triplet) corresponding to the target triplet based on the dataset. In this way, the first device can identify the service type corresponding to the target triplet based on the target feature, to facilitate implementation of an operation such as transmission control of a 5-tuple or application identification based on importance of the target feature in an actual scenario.

Figure 10:
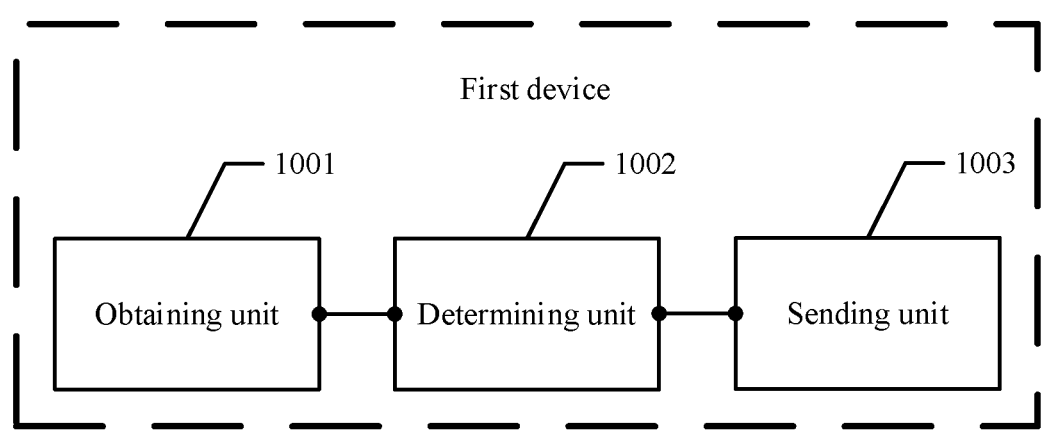
FIG. 10 is a schematic diagram of another structure of a first device according to an embodiment of this application.

Referring to FIG. 10, another embodiment of a first device in the embodiments of this application includes:

an obtaining unit 1001, configured to obtain a dataset corresponding to a plurality of packets transmitted by a second device, where the dataset includes at least two 5-tuples, the at least two 5-tuples include a first 5-tuple, and the first 5-tuple includes a source address, a destination address, a source port, a destination port, and a communications protocol; and a determining unit 1002, configured to determine a target feature corresponding to a target triplet based on the dataset, where the target triplet includes an address, a port, and the communications protocol, and the target feature is used to indicate a service type corresponding to the target triplet.

That the address corresponds to the port includes: The address is the source address and the port is the source port, or the address is the destination address and the port is the destination port.

The first device in this embodiment further includes:

a sending unit 1003, configured to send a target message to the second device, where the target message includes the target triplet and a rate limiting message, and the rate limiting message is used to indicate the second device to perform rate limiting control on a packet conforming to the target triplet.

The target feature includes: a client-server (CS) mode, a peer-to-peer (P2P) mode, a port-same mode, a voice over Internet Protocol (VoIP) mode, an instant message mode, or a port reservation mode on both sides. The port-same mode indicates that a port number of the source port is the same as a port number of the destination port.

In this embodiment, operations performed by the units in the first device are similar to those described in the embodiments shown in FIG. 2 to FIG. 8. Details are not described herein again.

In this embodiment of this application, the obtaining unit 1001 obtains the dataset, where the dataset includes the at least two 5-tuples, and the determining unit 1002 determines the target feature (the target feature is used to indicate the service type corresponding to the target triplet) corresponding to the target triplet based on the dataset. In this way, the first device can identify the service type corresponding to the target triplet based on the target feature. In one aspect, this facilitates implementation of 5-tuple control transmission based on importance of the target feature in an actual scenario. In another aspect, the sending unit 1003 sends the target message to the second device, so that the second device performs the rate limiting control on the packet conforming to the target triplet.

Figure 11:
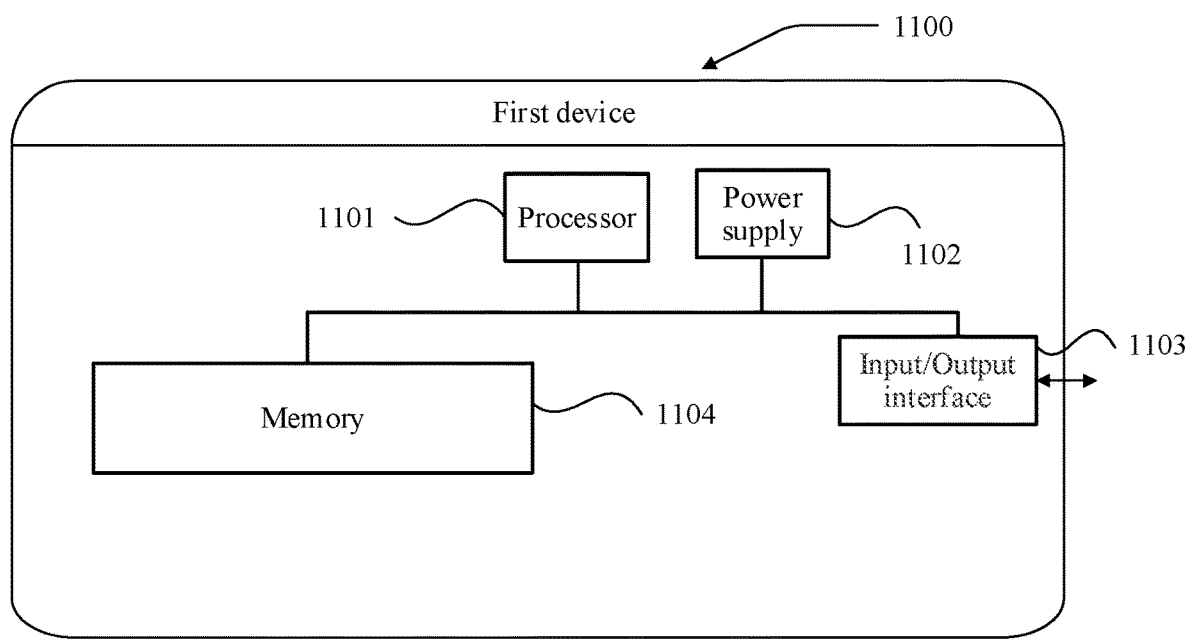
FIG. 11 is a schematic diagram of another structure of a first device according to an embodiment of this application.

The following describes a first device in an embodiment of this application. Referring to FIG. 11, another first device in this embodiment of this application may include:

The first device 1100 may include one or more processors 1101 and a memory 1104, and the memory 1104 stores one or more application programs or data.

The memory 1104 may be volatile storage or persistent storage. The programs stored in the memory 1104 may include one or more modules, and each module may include a series of instruction operations for the first device 1100. Further, the processor 1101 may be configured to communicate with the memory 1104, and perform the series of instruction operations in the memory 1104 on the first device 1100.

The first device 1100 may further include one or more power supplies 1102, one or more input/output interfaces 1103, and/or one or more operating systems such as Windows Server™, Mac OS X™, Unix™, Linux™ and FreeBSD™.

The processor 1101 may perform the operations performed by the first device in the embodiments shown in FIG. 2 to FIG. 8. Details are not described herein again.

This application further provides a communications system. The communications system includes a first device and a second device. The first device performs the operations performed by the first device in the embodiments shown in FIG. 2 to FIG. 8. The second device is configured to receive target information, and perform rate limiting control on a packet conforming to a target triplet based on rate limiting information. The target information includes the target triplet and the rate limiting information.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any

What is claimed is:

1. A service type determining method, comprising:
receiving a plurality of packets transmitted by a second device;
obtaining, by a first device, a dataset corresponding to the plurality of packets, wherein the dataset comprises at least two 5-tuples, the at least two 5-tuples comprise a first 5-tuple, and the first 5-tuple comprises a source address, a destination address, a source port, a destination port, and a communications protocol;
determining, by the first device based on the dataset, a target feature corresponding to a target triplet, wherein the target triplet comprises an address, a port, and the communications protocol, and the target feature is used to indicate a service type corresponding to the target triplet, and
wherein the address is the source address and the port is the source port, or the address is the destination address and the port is the destination port;
determining the service type based on the target feature; and
forwarding the plurality of packets based on the service type;
wherein the first device has two sides with one side connected to a terminal device and one side connected to a network device, wherein the target feature comprises: a client-server (CS) mode, a peer-to-peer (P2P) mode, a port-same mode, a voice over Internet Protocol (VoIP) mode, an instant message mode, or a port reservation mode on the two sides, and the port-same mode indicates that a port number of the source port is the same as a port number of the destination port;
wherein the determining, by the first device based on the dataset, a target feature corresponding to a target triplet comprises:
either
obtaining, by the first device based on the dataset, a quantity of peer ports, wherein the peer port is not a random port nor a service port, and an address in the target triplet is not a client address;
when the port in the target triplet is the destination port, the peer port is the source port, or when the port in the target triplet is the source port, the peer port is the destination port; and
determining, by the first device based on the quantity of peer ports, that the target feature comprises the port reservation mode on both sides and that the port in the target triplet is a service port in the port reservation mode on both sides;
or
obtaining, by the first device based on the dataset, an address quantity set of each port in the peer ports, wherein the address quantity set comprises a first value;
when the port in the target triplet is the destination port, the peer port is the source port; or when the port in the target triplet is the source port, the peer port is the destination port;
obtaining, by the first device based on the address quantity set, a second value, wherein the second value is a sum of all values comprised in the address quantity set; and
determining, by the first device based on a first target ratio, that the peer port is a service port in the instant message mode, wherein the first target ratio is a ratio of the first value to the second value.

2. The method according to claim 1, wherein the target feature comprises the CS mode or the P2P mode, and the determining, by the first device based on the dataset, a target feature corresponding to a target triplet comprises:
determining, by the first device based on the dataset, a 5-tuple corresponding to the target triplet; and
determining, by the first device based on the corresponding 5-tuple, the target feature.

3. The method according to claim 2, wherein the determining, by the first device based on the corresponding 5-tuple, the target feature comprises:
determining, by the first device based on that a quantity of corresponding 5-tuples is greater than a first threshold and the port in the target triplet is a well-known port, that the target feature is the CS mode and that the port in the target triplet is a service port in the CS mode, wherein a well-known port is a port whose value of the port is greater than or equal to 0 and is less than or equal to 1023.

4. The method according to claim 2, wherein the determining, by the first device based on the corresponding 5-tuple, the target feature corresponding to the target triplet comprises:
determining, by the first device based on a quantity of non-service ports comprised in the corresponding 5-tuple, a quantity of service ports comprised in the corresponding 5-tuple, and a port that is in the target triplet and that is not identified as a service port, that the target feature corresponding to the target triplet is the P2P mode and that the service port is a service port in the CS mode or a service port in another mode.

5. The method according to claim 1, wherein the determining, by the first device based on the dataset, a target feature corresponding to a target triplet comprises:
obtaining, by the first device, a third value, wherein the third value is a quantity of 5-tuples corresponding to a target 2-tuple, and the target 2-tuple comprises the port in the target triplet and the communications protocol;
determining, by the first device, a fourth value, wherein the fourth value is a quantity of 5-tuples whose source ports are the same as destination ports in the 5-tuple corresponding to the target 2-tuple in the dataset; and
determining, by the first device based on a relationship between a second target ratio and a sixth threshold, that the target feature is the VoIP mode and that the port in the triplet is a service port in the VoIP mode, wherein the second target ratio is a ratio of the fourth value to the third value.

6. The method according to claim 1, wherein the method further comprises:
determining, by the first device based on the target feature, an application to which the target triplet belongs.

7. The method according to claim 1, wherein the method further comprises:
sending, by the first device, a target message to the second device, wherein the target message comprises the target triplet and a rate limiting message, and the rate limiting message is used to indicate to the second device to perform rate limiting control on a packet conforming to the target triplet.

8. A first device, comprising a processor, wherein the processor is coupled to a memory, the memory is configured to store a computer program or an instruction, and the processor is configured to execute the computer program or the instruction in the memory, to perform the method according to claim 1.

9. A communications system, comprising a first device and a second device; wherein
- the first device is configured to perform the method according to claim 1;
- the second device is configured to receive target information, wherein the target information comprises a target triplet and rate limiting information; and
- the second device is further configured to perform, based on the rate limiting information, rate limiting control on a packet conforming to the target triplet.

* * * * *